Patented May 9, 1939

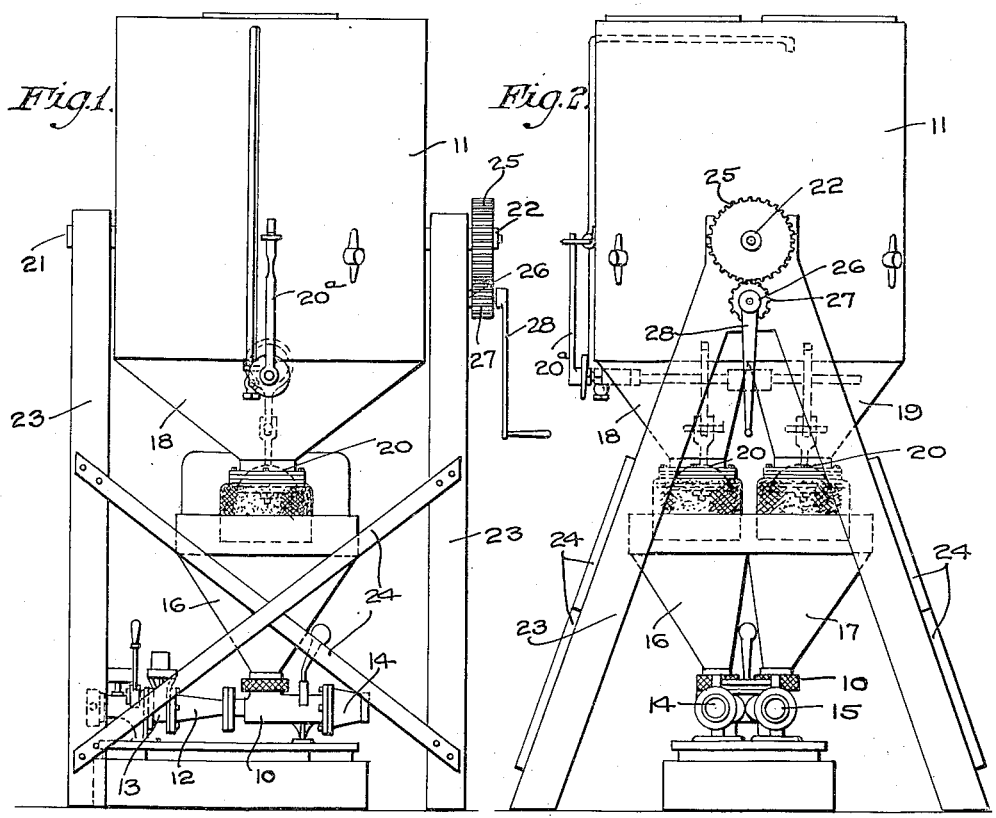
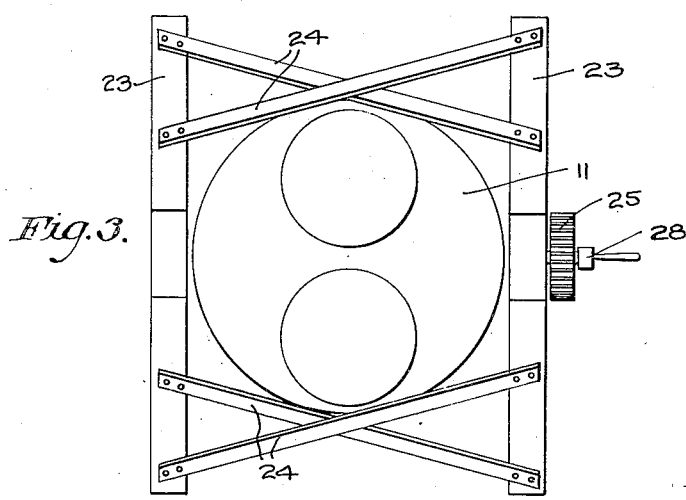

2,157,520

UNITED STATES PATENT OFFICE 2,157,520

APPARATUS FOR HANDLING FOAM CHEMICALS

George Blair, Berwyn, Pa., assignor to National Foam System, Inc., Philadelphia, Pa., a corporation of Delaware Application July 21, 1936, Serial No. 91,658

2 Claims. (Cl. 221—120)

This invention relates to apparatus for the extinguishment of fires and more particularly to an apparatus for facilitating the handling of the material employed in the producing of fire extinguishing foam.

In the extinguishment of fires, it is imperative that a continuous supply of fire extinguishing foam be produced during the continuance of the fire. While this may be effected by continuously introducing manually into separate hoppers of the foam producing apparatus the acid and basic foam producing ingredients ordinarily employed, it has been found much more effective and convenient to employ an apparatus of the character disclosed in United States Letters Patent No. 1,973,601, granted September 11, 1934, to Fisher L. Boyd. In this prior patent is disclosed an apparatus for handling the foam forming ingredients consisting of a main storage chamber adapted to maintain in separated relation dry powdered foam forming ingredients, such as aluminum sulphate and bicarbonate of soda, in combination with means for permitting the ready discharge of these substances into the hoppers of the foam producing apparatus. This patented apparatus not only did away with the necessity for manually pouring the foam producing substances into the hoppers of the foam generators, but it also facilitated the continuity of supply of the substances to the generator.

When apparatus of the type disclosed in the aforesaid Boyd Patent No. 1,973,601 is employed on ships and in other locations in which the storage chamber is subjected to more or less constant vibration, it has been found that due to this vibration the dry powdered chemicals stored in the compartment of the storage chamber are shaken down to such extent that they form a relatively solid mass, thereby interfering with the free discharge of the powdered chemicals from their respective compartments when the need for such discharge arises. This settling of the powdered chemicals into the form of a solid mass occurs as the result of a gradual expelling of the air from the voids ordinarily present in the aggregate of the powder stored within the chamber, the rate of expulsion from these voids being increased as the vibration to which the chamber is subjected is increased. If the aggregrate of powdered chemicals so subject to vibration is permitted to settle without further attention, the powders may cake into the form of a solid mass which will not flow freely from the storage chamber into the hoppers of the foam generator, in consequence of which the continuity of supply of the foam forming chemicals to the foam generator is interfered with, if not entirely interrupted.

It is among the objects of the present invention to provide an arrangement which overcomes the objections above noted and which eliminates the possibility of the powdered chemicals from settling into the form of a solid mass which is not only difficult to dislodge but which also interferes with the free discharge of the chemicals from the storage container.

More particularly, it is an object of the present invention to provide in an apparatus of the type above described means for reversing the position of the storage container periodically and as frequently as conditions may warrant to thereby loosen the powdered chemicals and so effectually prevent settling thereof into solid mass formation.

Other objects and advantages of the invention will appear more fully hereinafter, it being understood that the invention consists substantially in the combination, construction, location and relative arrangement of parts, all as described in detail hereinafter, as shown in the accompanying drawing, and as finally pointed out in the appended claims.

In the said accompanying drawing, Figure 1 is a side elevational view of the apparatus constructed in accordance with and embodying the principles of the present invention, the apparatus being shown positioned in discharging relation with respect to the hoppers of a foam producing apparatus;

Figure 2 is an end elevational view thereof; and

Figure 3 is a top plan view thereof.

Referring now to the drawing, it will be observed that the apparatus for facilitating the handling of the foam forming ingredients is shown in discharging position with respect to the foam generator, designated generally by the reference numeral 10. For a detailed description of the construction and operation of this foam generator 10, reference is herein made to United States Letters Patent No. 1,785,723 issued to Fisher L. Boyd, while for a detailed description of the construction and operation of the mechanism for effecting discharge of the chemicals from the storage chamber 11 of the apparatus, reference is herein made to the aforementioned Boyd Letters Patent No. 1,973,601.

For the present purposes, it is believed sufficient to point out that the generator 10 generally comprises a pipe or conduit 12 for supplying water from a source (not shown) through a Y-connection 13 to a pair of conduits 14 and 15, the latter being preferably united at a point in proximity to the place of application of the fire extinguishing foam. Respectively associated with the conduits 14 and 15 are a pair of hoppers 16 and 17 for receiving from the storage chamber 11 the powdered acid and basic foam forming chemicals.

The storage chamber 11 is interiorly divided to provide a pair of compartments in which the acid and basic foam forming chemicals are separately stored, the lower ends of these compartments terminating in funnel-shaped sections 18 and 19 equipped with valves 20—20 for controlling the discharge of the chemicals from their storage compartments. The simultaneous operation of these valves is effected by an externally located handle 20ª suitably connected to the valves 20—20 as described in the aforesaid Letters Patent No. 1,973,601.

While the foregoing description is of a dual type storage chamber for use in connection with a dual type foam generator, it will be understood that the present invention is not limited thereto, but, as will appear hereafter, is applicable to storage chambers having a single compartment in which the powdered acid and basic foam forming chemicals are stored in suitably mixed condition for subsequent discharge to a single-hopper type of foam generator. Parenthetically, it may be observed that in accordance with the present-day practice of generating foam, a suitable stabilizing agent, also in dry powdered form, is incorporated with one or the other or both of the principal foam forming chemicals.

In accordance with the present invention, the storage chamber 11, which, as shown in the drawing is of the dual compartment type but which, as just mentioned, may be of the single compartment type, is provided with oppositely projected trunnions 21—22 suitably journalled in bearings formed in the upper extremities of a pair of supporting side frames 23—23. These frames are, preferably, of inverted V shape with the divergent legs thereof interconnected by bracing struts 24—24, thereby providing a supporting frame structure sufficiently rigid and strong to adequately support the weight of the chamber 11 when filled. It will be observed that the side frames and interconnecting brace struts are so designed and assembled that the chamber 11 is free to be rotated about the horizontal axis of the trunnions 21—22 through a complete circle of 360 degrees.

The trunnion 22 projects beyond the bearing in which it is journalled sufficiently to permit a gear 25 to be keyed thereto. Journalled in the side frame immediately beneath the trunnion 22 is a stub shaft 26 to which is keyed a pinion 27 adapted for meshed or toothed engagement with the gear 25. A handle 28 is secured to the stub shaft 26 for effecting rotation of the pinion 27 and its meshed gear 25, thereby enabling the storage chamber 11 to be rotated from the position shown in Figures 1 and 2 into one in which the chamber is reversed end for end. Moreover, by means of the handle 28 the chamber 11 may be rocked about its journals to loosen any of the powdered chemicals which may have settled into solid mass formation.

Experience has shown that best results are obtained if the chamber is periodically reversed in position so that full advantage may be taken of the vibrating influences to which the chamber is subjected when installed, for example, on board a ship. Thus, assuming that for a certain period the chamber is positioned as shown in Figures 1 and 2 in consequence of which the chemicals have settled into more or less solid mass formation due to vibration, by reversing the chamber end for end the solid mass of chemicals is disrupted by the same vibrations which originally induced the settling action. By repeating this cycle of reversing the chamber end for end as frequently as conditions may warrant, it will be apparent that the powdered chemicals stored in the chamber will be shifted periodically from one end of the chamber to the other resulting in a breaking up of the solid mass formation, in consequence of which the chemicals will always be in proper condition for ready discharge into the hopper or hoppers of the foam generator. It will be understood, of course, that should a supply of the powdered chemicals be required during the period that the storage chamber is in the reverse position from that shown in Figures 1 and 2, it is an exceedingly simple matter to rotate the chamber into the required discharging relation with respect to the foam generator.

It will be understood that the invention as hereinbefore described is susceptible of various changes and modifications without departing from the real spirit or general principles thereof and it is accordingly intended to claim the same broadly, as well as specifically, as indicated by the appended claims.

What is claimed as new and useful is:

1. In a fire extinguishing apparatus for the formation of fire extinguishing foam by the intermixture of water with dry powdered foam-forming materials and comprising hopper means for receiving dry powdered foam-forming materials and directing the same into flowing water for cooperation therewith to produce fire extinguishing foam; in combination a framework disposed to enclose said hopper, a chamber mounted on said framework for rotation about a horizontal axis, said chamber being disposed over said hopper and having a valved discharge outlet in its bottom over said hopper to permit the ready flow of the powdered material into said hopper in case of fire, and means for rotating said chamber about the horizontal axis for the occasional inversion of the chamber to subject the powdered material to any existing vibration to maintain it in a flowable condition.

2. In a fire extinguishing apparatus of the type forming a fire extinguishing foam by the introduction of dry powdered foam-forming materials into a stream of water and which is employed under vibratory conditions tending to pack the materials; in combination a framework enclosing a hopper employed to receive the powdered material and introduce the same into a stream of water, a chamber for containing said dry powdered material, said chamber being journalled in said framework for rotation about a horizontal axis, said chamber having in its normally lower end only a valve controlled discharge outlet disposed over devices adapted to receive the powder for mixing the same with a stream of water to form in case of fire a fire extinguishing foam, and means for rotating said chamber about the horizontal axis for the occasional inversion of the chamber and to subject the powdered material to the vibratory conditions in the inverted position to maintain the material in flowable condition.

GEORGE BLAIR.